United States Patent [19]

Lawrence et al.

[11] Patent Number: 5,637,333
[45] Date of Patent: Jun. 10, 1997

[54] SEA URCHIN FEED AND METHOD OF PRODUCING SAME

[75] Inventors: Addison L. Lawrence, Port Aransas, Tex.; John M. Lawrence, Lutz, Fla.; Joseph P. Kearns, Overland Park; Galen J. Rokey, Sabetha, both of Kans.

[73] Assignee: Wenger Manufacturing Co. Inc., Sabetha, Kans.

[21] Appl. No.: 562,005

[22] Filed: Nov. 22, 1995

[51] Int. Cl.$^6$ .................................................. A23K 1/00
[52] U.S. Cl. .............................. 426/2; 426/516; 426/805
[58] Field of Search ............................... 426/1, 2, 516, 426/643, 805

[56] References Cited

U.S. PATENT DOCUMENTS

| 4,816,278 | 3/1989 | Sasamoto et al. | 426/516 |
| 4,981,711 | 1/1991 | Kearns et al. | 426/805 |
| 5,169,661 | 12/1992 | Yutaka et al. | 426/643 |

OTHER PUBLICATIONS de Jong–Westerman et al.; The effect of different nutrient formulations in artificial diets on gonad growth in the sea urchin *Strongylocentrotus droebachiensis*; Can. J. Zool. 73: 1495–1502 (1995).

Fernandez et al.; Growth rate of adult sea urchins, *Paracentrotus lividus* in a lagood environment: The effect of different diet types; Echinoderms through Time, David, Guille, Feral and Roux (eds), 1994.

Sloan, N.A., Echinoderm Fisheries of the world: A review; Proceedings of 5th International Echinoderm Conference; Galway; 24–29 Sep. 1994, pp. 109–124.

Fernandez; Mise en place d'un elevage pilote de l'oursin violet *Parracentrotus lividus* en Corse; C.R.I.T.T. Corse Technologie.

Lawrence et al.; The effect of quantity and quality of prepared diets on production in *Paracentrotus lividus* (Echinodermata: Echinoidea); Echinoderm Research 1991, L. Scalera–Liaci & C. Canicatti (eds) ©1992 Balkema, Rotterdam, ISBN 90 54100494.

Klinger et al.; The effect of termperature on feeding, digestion, and absorption of lytechinus variegatus (Lamarck) (Echinodermata: Echinoidea); Oct. 29, 1985.

Levin et al.; Artificial Diet for Laboratory–Maintained Sea Urchin; Practical Biology; UDS 593.95; Aquaculture, pp. 344–349.

Klinger; Feeding rates of *Lytechinus variegatus* Lamarck (Echinodermata: Echinoidea) on differing physiognomies of an artificial food of uniform composition; International Echinoderms Conference, Tampa Bay, J. M. Lawrence, ed (a. A. Balkerna, Rotterdam, 1982).

Lawrence et al.; The effect of quality of food on feeding and digestion in *Paracentrotus lividus* (Lamarck) (Echinodermata: Echinoidea); Mar. Behav. Physiol. 1989, vol. 15, pp. 137–144.

Klinger et al.; Phagostimulation of *Lytechinus variegatus* (Lamarck) (Echinodermata: Echinoidea); Mar. Behav. Physiol. 1982, vol. 11, pp. 49–67.

*Primary Examiner*—George Yeung
*Attorney, Agent, or Firm*—Hovey, Williams, Timmons & Collins

[57] ABSTRACT

Improved sea urchin feeds are provided which are very efficiently utilized by sea urchins and significantly increase gonadal development. The feeds are semi-moist, stable, extruded solid pellets or bodies which sink in sea water and have protein and carbohydrate fractions as well as a moisture content of from about 12–40% by weight. The feed bodies have an as manufactured water activity of up to about 0.8, are storable at ambient temperature for a period of at least two months, and are self-sustaining in sea water for a period of at least about 24 hours. Preferred feeds include kelp, fish oil and humectant.

31 Claims, No Drawings

SEA URCHIN FEED AND METHOD OF PRODUCING SAME

BACKGROUND OF THE INVENTION

1. Field of the Invention

The present invention is broadly concerned with an improved, extruded, semi-moist, stable sea urchin feed product which is very efficiently utilized by sea urchins and significantly increases economically important gonadal growth. More particularly, the invention pertains to such extruded feeds which have proper size, texture, specific gravity and water stability properties rendering the feed ideal for the particular feeding habits of sea urchins. The feeds of the invention include protein and carbohydrate, and preferably a humectant (e.g., glycerin, propylene glycol and corn syrup), and have a specific gravity in sea water insuring that the feed will sink.

2. Description of the Prior Art

Sea urchins are marine echinoderms of the class Echinoidea, and have been harvested by man as a food source delicacy for thousands of years. All commercially exploited sea urchins are epibenthic, shallow-water grazers, and typically position themselves atop and slowly feed upon a food source. Sea urchins are harvested according to season for their gonads, which are highly prized in Asian and Mediterranean countries. Indeed, sea urchin gonads are a premium product which command extremely high prices on the world market.

In light of these considerations, it has been suggested in the past that sea urchins be farmed in aquatic cages. Moreover, attempts have been made in the past to provide artificial feeds for sea urchins, so as to replicate or even improve natural sea urchin growth and development. Thus, it has been known to prepare artificial feeds using protein and carbohydrate sources along with organic binders such as agar. These feeds were labor-intensive and expensive to produce, and were thus not commercially viable. From a functional standpoint, many of these prior artificial feeds were also deficient in that they tended to disperse in sea water after a relatively short period of time, and thus did not meet the specialized feeding habits of sea urchins.

There is accordingly a real and unsatisfied need in the art for a improved sea urchin feed product which can be economically produced on a commercial scale and which have the necessary properties of resiliency, specific gravity, nutritional qualities and prolonged self-sustension in sea water allowing the feeds to be used as a natural food substitute for sea urchins in aquatic farming operations.

SUMMARY OF THE INVENTION

The present invention overcomes the problems outlined above and provides an improved sea urchin feed which is shown to be ideal for the growth and gonadal development of sea urchins. Broadly speaking, the feeds of the invention are in the form of extruded, semi-moist, solid pellet-type bodies which will sink in sea water. The bodies include 12–24% by weight total crude protein, 30–60% by weight carbohydrate, and from about 12–40% by weight moisture. In order to accommodate the practical necessities of storage and sea water stability, the feed bodies have an as manufactured water activity of up to about 0.8, are storable at ambient temperature conditions without significant degradation or molding for a period of at least two months, and are self-sustaining in sea water for a period of at least about 24 hours.

In preferred forms, the sea urchin feeds of the invention include a polyhydroxy humectant such as glycerin, as well as phosphoric acid and potassium sorbate in sufficient quantities to insure that the feeds have the necessary storage and sea water integrity. From a nutritional standpoint, the products also advantageously include fish oil and kelp, although these are not absolutely essential ingredients.

The feeds of the invention are produced by extrusion cooking wherein the starting ingredients are preferably preconditioned and fed into and through an elongated extruder barrel equipped with one or more axially rotatable auger screws therein. During passage through the extruder barrel, the mixture is subjected to increasing levels of temperature, pressure and shear, and the material is then ultimately extruded through a restricted orifice die. As the extrudate merges from the die, it is conventionally cut to a desired length and then may be further dried as required to achieve the desired final moisture content.

Actual feeding trials using the extruded feeds of the invention demonstrate that the feeds are more efficiently utilized by sea urchins than natural feeds. More importantly, these tests also confirm that the feeds hereof very significantly enhance gonadal growth and weight, thus enhancing the commercially significant portion of the sea urchins.

DETAILED DESCRIPTION OF THE PREFERRED EMBODIMENT

As indicated, the semi-moist, stable sea urchin feeds of the invention include protein and carbohydrate fractions. The total crude protein level of the feeds is preferably 12–24% by weight, and more preferably 15–20% by weight. Virtually any animal, marine or vegetable protein source may be used in the invention, but it is particularly preferred to use sources selected from the group consisting of marine meal, marine oil, soy, wheat, oats, barley, corn and mixtures thereof as protein sources. Where fish oil is used in the feed products, it should be present at a level of from about 0.1–8% by weight, and more preferably from about 0.2–4% by weight. As finally processed, the feeds of the invention should exhibit a protein dispersibility index (PDI) less than about 30%, and more preferably from about 15–25%. The PDI is a measure of the ratio of water soluble protein to total protein, and is measured by a test established by the American Association of Cereal Chemistry as AACC Method 46-24, which is incorporated by reference herein. Two feeds in accordance with the invention were measured for PDI and gave results of 21.4% and 20.7% respectively. The total crude protein contents of these feeds were 14.27% and 13.78% respectively.

In terms of carbohydrate content, the feeds of the invention should contain 30–60% by weight carbohydrate, and more preferably 40–55% by weight thereof. As will be readily appreciated, many vegetable protein sources also provide carbohydrates. To this end, the carbohydrate sources particularly preferred for use in the invention may be selected from the group consisting of soy, wheat, oats, barley, corn, lupin, rice and mixtures thereof.

Seaweed is the predominant natural food for sea urchins. Therefore, the feeds of the invention may also include kelp, which of course contributes to the total crude protein, fat, carbohydrate and micronutrient content of the feeds. Kelp when used is normally present at a level of from about 1–65% by weight, and more preferably from about 5–35% by weight.

It is important that the feeds of the invention be semi-moist and resilient to the touch. Accordingly, the feeds should contain from about 12–40% by weight moisture, and more preferably from about 20–30% by weight moisture. At the same time, the feeds hereof must have adequate ambient storage characteristics, i.e., the feeds should resist significant degradation and molding upon ambient temperature storage for a period of at least about two months, and preferably at least about six months. Accordingly, the products should have an as manufactured water activity (i.e., at the time of initial manufacture) of up to about 0.8, and more preferably up to about 0.7. In order to accomplish this, it is desirable to incorporate into the feeds a humectant, typically a polyhydroxy compound such as glycerin. The humectant level should be from about 3–20% by weight, and more preferably from about 5–12% by weight. These desirable properties are also enhanced by the addition of phosphoric acid and a preservative such as potassium sorbate into the feed products. Phosphoric acid is advantageously used at a level of from about 0.1–3% by weight, and more preferably from about 0.5–2% by weight. Inclusion of these types of ingredients, together with the preferred extrusion processing, insures that the feeds will have the necessary storage characteristics.

It is also very important that the products of the invention be substantially self-sustaining in sea water for a period of at least 24 hours, and more preferably for at least four days. This allows the slow-feeding sea urchins the opportunity to migrate to and consume the feeds in their natural manner. By self-sustaining, it is meant that the products remain substantially intact and do not depreciably dissociate, dissolve or unduly expand when exposed to sea water, while also retaining necessary nutrient quality.

The feeds of the invention must sink in sea water to be usable by sea urchins. Accordingly, the products should have a specific gravity in sea water of greater than about 1, and more preferably greater than about 1.1. Other gross physical properties of interest include: bulk density, which should be from about 35–50 lb/ft$^3$ and more preferably from about 40–45 lb$^3$/ft; maximum pellet diameter of 0.5–1.5 cm, and more preferably from about 0.75–1 cm; pellet length of from about 1–2.5 cm, and more preferably from about 1.5–2 cm; and expansion, which should at a maximum be up to about 20%, and more preferably up to about 10%. Expansion refers to the average cross-sectional area of an extruded pellet as compared with the nominal cross-sectional area of the corresponding die orifice used in fabrication of the pellet. Thus, if a given die orifice has a cross-sectional area of "X", the average cross-sectional area of an extruded pellet should be no more than 1.2X, and more preferably no more than 1.1X.

The feeds of the invention are produced using conventional extrusion processing equipment. It is particularly preferred to employ for this purpose a Wenger TX Series twin screw extruder (as described in U.S. Pat. No. 4,875,847, incorporated by reference herein), together with a Wenger DDC preconditioner (as described in U.S. Pat. No. 4,752,139, incorporated by reference herein).

The preferred DDC preconditioner is designed to receive incoming ingredients into moisturized and partially cook these ingredients prior to delivery thereof to the extruder. The preconditioner includes an elongated, dual-chamber barrel equipped with an inlet and a spaced outlet, the latter being in communication with the extruder barrel inlet. The preconditioner also includes a pair of rotatable shafts each equipped with outwardly extending paddles or mixing elements. In addition, the preconditioner barrel is normally provided with inlets for introduction of steam, water or other liquids into the confines of the barrel. During preconditioning, the preblended starting ingredients are subjected to heating, moisturizing and mixing by virtue of the injection of steam and water into the preconditioner barrel, and the action of the rotating paddles. Preferably, preconditioning is carried out to achieve a maximum temperature of from about 30°–95° C., and more preferably from about 65°–90° C.; the average residence time in the preconditioner ranges from about 15 seconds to 3 minutes, and more preferably from about 2–2.5 minutes. Sufficient moisture is added to the dry ingredients during preconditioning to achieve a total moisture content in the material as it leaves the preconditioner of from about 18–30% by weight wet basis, and more preferably from about 20–25% by weight.

The extruder devices are themselves well know and include an elongated, multiple section barrel with one or two elongated, axially rotatable auger screws therein and an endmost restricted orifice extrusion die mounted to the barrel. The barrel sections are commonly equipped with jackets for the introduction of heating or cooling media, and also have injection ports allowing steam and/or water to be injected directly into the confines of the barrel for mixing with the ingredients during processing.

After preconditioning, the treated ingredients are fed into the inlet of the extruder barrel. During passage of the ingredients along and through the extruder, it is preferred that the material is heated to a maximum temperature of up to about 175° C., and more preferably from about 110°–125° C. Maximum pressure conditions achieved in the extruder barrel should be in the range of from about 150–600 psi, and more preferably from about 200–400 psi. The total average residence time of material in the barrel is from about 20–50 seconds, and more preferably from about 25–30 seconds. If desired, the extruder (which may be either or single twin screw) is equipped with a mid-barrel vent allowing passage of moisture from the material in order to create a denser final product. In such an extruder configuration, the material first passes through a cooking zone, and then through venting and forming zones, with final extrusion through the endmost barrel die. In such processing, the materials are heated to the maximum temperature achieved in the extruder in the cooking zone. In the venting zone, steam and/or volatiles are vented. In the forming zone, downstream of the vent, the material is densified immediately prior to extrusion.

In many cases, the extruded products should be partially dried to achieve the desired moisture level. This can be accomplished by any conventional means, although multiple-pass dryer/cooler devices of known construction are most preferred. No particular drying conditions are required so long as the dictates of the invention are met.

In summary, certain ingredients and properties of the extruded feeds of the invention are summarized in the following table, which set forth approximate values.

TABLE 1

| Ingredients or Properties | Broad Range | Preferred Range |
| --- | --- | --- |
| Total Crude Protein | 12–24% by wt. | 15–20% by wt. |
| Total Carbohydrate | 30–60% by wt. | 40–55% by wt. |
| Total Crude Fat | 3–9% by wt. | 4–7% by wt. |
| Total Moisture | 12–40% by wt. | 20–30% by wt. |
| Kelp | 1–65% by wt. | 5–35% by wt. |
| Humectant | 3–20% by wt. | 5–12% by wt. |
| Fish Oil | 0.1–8% by wt. | 0.2–4% by wt. |
| Phosphoric Acid | 0.1–3% by wt. | 0.5–2% by wt. |
| Water Activity | up to 0.8 | up to 0.7 |
| Ambient Storage | at least 2 months | at least 6 months |
| Self-Sustension in Sea Water | at least 24 hours | at least 4 days |
| Protein Dispersibility Index | less than 30% | 15–25% |
| Specific Gravity in Sea Water | greater than 1.0 | greater than 1.1 |
| Bulk Density | 35–50 lb/ft$^3$ | 40–45 lb/ft$^3$ |
| Maximum Diameter | 0.5–1.5 cm | 0.75–1.0 cm |
| Length | 1–2.5 cm | 1.5–2 cm |
| Expansion | up to 20% | up to 10% |

The following examples are presented in order to illustrate the production and use of feeds in accordance with the invention. It is to be understood however that these examples are provided by way of illustration only and nothing therein should be taken as a limitation upon the overall scope of the invention.

EXAMPLE 1

In this example, two urchin feed products were produced. The runs were carried out using formulas having the following ingredients.

TABLE 2

| | RECIPE NO. | |
| --- | --- | --- |
| Ingredient (% By Wt.) | 1 | 2 |
| Kelp Meal | 60.01 | 20.02 |
| Soy Flour | 6.48 | 54.98 |
| Fish Oil | 1.50 | 2.29 |
| Glycerine | 7.98 | 7.98 |
| Phosphoric Acid (75%) | 1.01 | 1.01 |
| Potassium Sorbate | 0.22 | 0.22 |
| Wheat Flour | 22.80 | 13.49 |

The dry ingredients of each recipe were ground through a 60 mesh screen and the liquid ingredients were then added with mixing. At this point, the prepared starting recipes were fed into and through a preconditioner/extrusion cooker apparatus. In particular, the equipment included a Model MDL 2 DDC preconditioner (Configuration No. 329) as well as a six head TX52 twin screw extruder. These components are commercialized by Wenger Manufacturing of Sabetha, Kans. The TX52 configuration included (where all pats are Wenger parts): heads 1–6, 55316-001, 55307-001 (heads 2–5), and 55319-001; and rotating elements from inlet to outlet, 55357-203, 55357-203, 55357-203, 55325-003, 55324-101 O, 55324-102 F, 55324-105 F, 55324-103, 55325-003, 55324-003, 55324-101 O, 55324-103 F, 55324-105 F, 55324-003, 55325-003, 55324-101 O, 55324-103 R, 55324-101 R, and 55321-007. The die and knife configuration included knife holder 55225-003 and six No. 19430-005 knife blades. The die/adapter assembly coupled to the outlet of the extruder barrel included Wenger parts 55372-723, 55372-723, 74010-614 and 31450-975.

In carrying out the runs described below, the premixed starting ingredients were fed into the preconditioner along with steam and water to premoisture and partially precook the ingredients. After preconditioning, the material was fed into the extruder barrel where the material was subjected to increasing temperatures, pressure and shear. In addition, water and steam were fed into the interior of the extruder barrel during passage of the ingredients therethrough. Also, in some instances, the jacketed extruder heads were provided with heating or cooling media such as cold water (CW), hot oil (HO) or steam (S).

As the extrudate emerged from the barrel die, it was cut using the described knife structure. Thereupon, the products were collected as soft, moist, stable sea urchin feeds.

The following table sets forth the results of this series of production runs.

TABLE 3

| | | Run #1 | Run #2 |
| --- | --- | --- | --- |
| DRY RECIPE INFORMATION | | | |
| Feed Screw Speed | rpm | 26 | 26 |
| PRECONDITIONING INFORMATION | | | |
| Steam Flow to Preconditioner | kg/hr. | 12 | 11 |
| Water Flow to Preconditioner | kg/hr. | 7.8 | 7.8 |
| EXTRUSION INFORMATION | | | |
| Moisture Entering Extruder | % wb | 20.25 | 24.46 |
| Extruder Shaft Speed | rpm | 350 | 350 |
| Extruder Motor Load | % | 21 | 23 |
| Water Flow to Extruder (barrel injection) | kg/hr. | 4 | 4 |
| Steam Flow to Extruder (barrel injection) | kg/hr. | 5 | 5 |
| Control/Temperature 2nd Head | °C. | CW/81 | — |
| Control/Temperature 3rd Head | °C. | CW/88 | — |
| Control/Temperature 4th Head | °C. | S/121 | — |
| Control/Temperature 5th Head | °C. | S/99 | — |
| Control/Temperature 6th Head | °C. | CW/66 | — |
| MOISTURE INFORMATION | | | |
| Extruder Discharge | % wb | 23.01 | 24.33 |
| Recipe Number | | 1 | 2 |

The extrudates from these runs exhibited very good shape, durability and texture and were superior sea urchin feeds.

EXAMPLE 2

In this example, two sea urchin feeds were prepared in the manner outlined in Example 1, using in each case Recipe #3 set forth below. The starting formula included the following ingredients.

TABLE 4

| Ingredient (% By Wt.) | RECIPE NO. 3 |
| --- | --- |
| Kelp Meal | 12.81 |
| Soy Flour | 10.22 |
| Fish Oil | 0.23 |
| Lecithin | 0.91 |
| Corn | 29.28 |
| Wheat Middlings | 25.16 |
| Cholesterol | 0.27 |
| Fish Meal | 10.98 |
| Monobasic Sodium Phosphate | 1.22 |
| Ethoxyquin | 0.18 |
| Vitamin/Mineral Premix | 0.15 |
| Stay C Vitamin C Additive | 0.08 |
| Glycerin | 7.32 |
| Phosphoric acid (75%) | 0.91 |
| Potassium sorbate | 0.27 |

The preconditioner employed in Run #3 was an MDL 2 DDC (Configuration #109). The extruder was an eight head Wenger TX52 twin screw extruder including the following Wenger parts: heads 1–8, 55316-001 (head 1), 55307-001 (heads 2–4 and 6–7), 55343-003 (head 5), and 55319-001 (head 8); rotating elements from inlet to outlet, 55357-003, 55357-003, 55357-003, 55357-003, 55325-103, 55324-101 R, 55324-103 R, 55324-105 R, 55325-003, 55324-101 R, 55324-103 R, 55324-105 R, 55325-003, 55324-003, 55325-003, 55325-003, 55325-003, 55325-003, and 55321-005. The knife assembly included knife holder 55226-003 and three 19430-005 blades. The die/adapter assembly included parts 55372-703SP, 55372-103 BH, and 74010-319 NA. In Run #3, the extrudate was dried in a Wenger 4800 dryer operating in the cooler mode (i.e., without heating). Zones 1–3 of the dryer were at 29°, 26° and 25° C., respectively with first and second pass retention times of 8.6 and 11.3 minutes. The extrudate as discharged from the extruder had a density of 624 kg/m³ and the extrusion run gave a uniform, well-shaped, stable sea urchin food. After passing through the cooler, the product had a moisture content of 26.5% by weight.

The following table sets forth the data collected during this run.

TABLE 5

| | | Run #3 |
| --- | --- | --- |
| DRY RECIPE INFORMATION | | |
| Feed Screw Speed | rpm | 25 |
| PRECONDITIONING INFORMATION | | |
| Preconditioner Speed | rpm | 99 |
| Steam Flow to Preconditioner | kg/hr. | 11 |
| Water Flow to Preconditioner | kg/hr. | 7.98 |
| Preconditioner Discharge Temperature | °C. | 81 |
| Moisture Entering Extruder | % wb | 18.96 |
| EXTRUSION INFORMATION | | |
| Extruder Shaft Speed | rpm | 295 |
| Extruder Motor Load | % | 21 |
| Water Flow to Extruder (barrel injection) | kg/hr. | 17.38 |
| Steam Flow to Extruder (barrel injection) | kg/hr. | 5.9 |
| Control/Temperature 2nd Head | °C. | CW/95 |
| Control/Temperature 3rd Head | °C. | S/116 |
| Control/Temperature 4th Head | °C. | S/112 |
| Control/Temperature 5th Head | °C. | Vent |
| Control/Temperature 6th Head | °C. | CW/78 |
| Control/Temperature 7th Head | | CW/59 |
| Control/Temperature 8th Head | | CW/58 |
| MOISTURE INFORMATION | | |
| Extruder Discharge | % wb | 28.34 |
| Recipe Number | | 3 |

The equipment employed in Run #4 included a Wenger Model 1 DC preconditioner (Configuration #20) and a nine head TX 52 twin screw extruder. The extruder configuration included: heads 55316-001 (head 1); 5307-001 (heads 2–5 and 7–8), 55343-003 (head 6) and 55319-001 (head 9); rotating elements 55325-003, 55325-003, 55325-003, 55325-003, 55325-103, 55324-101 R, 55324-103 R, 55324-105 R, 55325-003, 55324-101 R, 55324-103 R, 55324-105 R, 55325-003, 55324-101 R, 55324-103 R, 55324-105 R, 55357-003, 55325-003, 55325-003, 55325-003, 55325-003, 55325-003, 55325-003, 55325-003, and 55321-005. The die and adapter assembly included parts 55372-703 SP, 55372-111 BH and 74010-319 NA.

The extrusion conditions recorded in this run are set forth below.

TABLE 6

| | | Run #4 |
| --- | --- | --- |
| DRY RECIPE INFORMATION | | |
| Feed Screw Speed | rpm | 27 |
| PRECONDITIONING INFORMATION | | |
| Preconditioner Speed | rpm | 161 |
| Steam Flow to Preconditioner | kg/hr. | 12.3 |
| Water Flow to Preconditioner | kg/hr. | 9.8 |
| Moisture Entering Extruder | % wb | 21.49 |
| EXTRUSION INFORMATION | | |
| Extruder Shaft Speed | rpm | 320 |
| Extruder Motor Load | % | 22 |
| Water Flow to Extruder (barrel injection) | kg/hr. | 17.50 |
| Steam Flow to Extruder (barrel injection) | kg/hr. | 6.5 |
| Control/Temperature 2nd Head | °C. | CW/58 |
| Control/Temperature 3rd Head | °C. | CW/58 |
| Control/Temperature 4th Head | °C. | CW/58 |
| Control/Temperature 5th Head | °C. | HO/115 |
| Control/Temperature 6th Head | °C. | HO/115 |
| Control/Temperature 7th Head | | CW/76 |
| Control/Temperature 8th Head | | CW/76 |
| Control/Temperature 9th Head | °C. | CW/78 |
| MOISTURE INFORMATION | | |
| Extruder Discharge | % wb | 31.71 |
| Recipe Number | | 3 |

The extrudate from this run was cooler-dried using the same setup of Run #3, a 30° C. temperature, and stage retention times of 3.4, 3.5 and 4.3 minutes. The product upon leaving the cooler-dryer had a moisture content of 26.94% by wt.

EXAMPLE 3

In this test, an urchin feed was produced as set forth in Example 1, using a recipe free of kelp. The recipe contained:

TABLE 7

| Ingredient (% By Wt.) | RECIPE NO. 4 |
| --- | --- |
| Corn | 36.54 |
| Wheat Middlings | 36.40 |
| Soybean Flour | 11.10 |
| Fish Meal | 10.00 |
| Calcium Carbonate (Limestone) | 1.68 |
| Monobasic Sodium Phosphate | 1.17 |
| Lecithin | 1.00 |
| Fish Oil | 0.71 |
| Salt | 0.61 |
| Cholesterol | 0.30 |
| Ethoxyquin | 0.20 |
| Vitamin/Mineral Premix | 0.20 |
| Stay C Vitamin C Additive | 0.08 |
| Canthaxonthin | 0.01 |

The equipment used was the same as that described in connection with Run #3 above. The extrusion conditions were as follows:

TABLE 8

| | | Run #5 |
| --- | --- | --- |
| DRY RECIPE INFORMATION | | |
| Feed Screw Speed | rpm | 25.5 |
| PRECONDITIONING INFORMATION | | |
| Preconditioner Speed | rpm | 99 |
| Steam Flow to Preconditioner | kg/hr. | 11 |
| Water Flow to Preconditioner | kg/hr. | 7.88 |
| Preconditioner Discharge Temperature | °C. | 93 |
| Moisture Entering Extruder | % wb | 18.83 |
| EXTRUSION INFORMATION | | |
| Extruder Shaft Speed | rpm | 295 |
| Extruder Motor Load | % | 15 |
| Water Flow to Extruder (barrel injection) | kg/hr. | 17.35 |
| Steam Flow to Extruder (barrel injection) | kg/hr. | 6.0 |
| Control/Temperature 2nd Head | °C. | CW/92 |
| Control/Temperature 3rd Head | °C. | S/115 |
| Control/Temperature 4th Head | °C. | S/110 |
| Control/Temperature 5th Head | °C. | Vent |
| Control/Temperature 6th Head | °C. | CW/76 |

TABLE 8-continued

| | | Run #5 |
| --- | --- | --- |
| Control/Temperature 7th Head | | CW/56 |
| Control/Temperature 8th Head | | CW/55 |
| Head Pressure | kPa | 8/1380 |
| Knife Drive Speed | rpm | 295 |
| FINAL PRODUCT INFORMATION | | |
| Extruder Discharge Moisture | % wb | 30.16 |
| Extruder Discharge Rate | kh/hr | 163.63 |
| Extruder Discharge Density | kg/m$^3$ | 608 |
| Dryer Discharge Density | kg/m$^3$ | 689.1 |
| Extruder Performance | | Stable |
| Duration of Run | min. | 90 |
| Recipe Number | | 4 |

The cooler-dryer conditions were as recorded relative to Run #3. The feed had a moisture content of 27.71% by weight after treatment in the cooler-dryer.

EXAMPLE 4

In this example, feed products produced in accordance with Runs #3 and #5 were tested in Chile, to determine the gonad growth effects thereof in sea urchins (*Loxechinus albus*). The tests were conducted during the spring when sea urchin gonads are mature, and autumn during gonadal development. During each such tests, 75 animals were placed in a field sea cage and in a sea water aquarium where sea water flow was controlled with pumps. The 75 animals in each test environment were divided into five groups: Group 1, fed the kelp-containing feed of Run #3; Group 2, the kelp-free feed of Run #5; Groups 3 and 4, two species of naturally occurring algae; and Group 5, which was starved. All feeds were given ad libitum. Before each test, the initial average gonad index (the percent of body weight represented by gonads, $GI_{avg}$) for a subsample of the animal population was determined. The following table sets forth the results of these tests, which presents approximate gonad index percentage data:

TABLE 9

| Group No. | Sea Cage-Spring ($GI_{avg}$ = 14%) | Aquarium-Spring ($GI_{avg}$ = 13%) | Sea Cage-Autumn ($GI_{avg}$ = 5%) | Aquarium-Autumn ($GI_{avg}$ = 5%) |
| --- | --- | --- | --- | --- |
| 1 | 20 | 16 | 22 | 18 |
| 2 | 17 | 16 | 19 | 20 |
| 3 | 8 | 7.5 | 12 | 7 |
| 4 | 7 | 8.5 | 12 | 8 |
| 5 | 3 | 3.5 | 2 | 1 |

These data demonstrate that the feeds of the present invention (Groups 1 and 2) give substantially higher and statistically significant increases in gonadal growth during both natural growth and dormancy periods; moreover, this effect is observed in both a natural setting (sea tidal cage) and in the laboratory (aquarium).

EXAMPLE 5

In this example, two species of sea urchins (*Strongylocentrotus franciscanus* and *Strongylocentrotus purpuratus*) were reared under ambient light conditions in a simulated sea water aquarium system using both natural kelp and the kelp pellet of Run #3 as comparative ad libitum feeds. Each test group included 20 animals from each species, for a total of 40 animals per group. The test was commenced on May 7 when initial animal weight and diameters were determined, and continued until June 5 of the next year. At the end of the study, the gonad index and gonad grade of the animals were measured. These results are set forth in the following table.

TABLE 10

| Species/Diet | Avg. Initial Weight (g) | Avg. Final Weight (g) | Avg. Initial Horizontal Diameter (cm) | Avg. Final Horizontal Diameter (cm) | Final Gonad Index (% body weight) | Final Gonad Grade (scale 1–10) |
|---|---|---|---|---|---|---|
| S. franciscanus/ kelp diet | 10 | 41.1 | 2.8 | 4.5 | 9.4 | 4.6 |
| S. franciscanus/ Run #3 diet | 10 | 29.5 | 2.8 | 4.0 | 25.1 | 5.1 |
| S purpuratus/ kelp diet | 2.4 | 37.8 | 1.8 | 4.6 | 8.0 | 4.3 |
| S. purpuratus/ Run #3 diet | 2.4 | 10.4 | 1.8 | 2.9 | 22.3 | <1 |

These data demonstrate that the animals fed the Run #3 pellets did not exhibit the degree of overall bodily growth shown by the kelp fed animals. However, the gonad index of the Run #3 fed animals was significantly greater than that of the kelp fed animals. Thus, the Run #3 fed animals reacted by reducing bodily growth while significantly increasing gonadal growth.

We claim:

1. A semi-moist, stable sea urchin feed comprising an extruded, solid body which will sink in sea water, said body including from about 12–24% by weight total crude protein, from about 30–60% by weight carbohydrate, and from about 12–40% by weight moisture, said body having an as manufactured water activity of up to about 0.8, being storable at ambient temperature for a period of at least about two months, and being self-sustaining in sea water for a period of at least about 24 hours.

2. The feed of claim 1, including from about 15–20% by weight total crude protein.

3. The feed of claim 1, including from about 40–55% by weight carbohydrate.

4. The feed of claim 1, including from about 20–30% by weight moisture.

5. The feed of claim 1 said body having a water activity of up to about 0.7.

6. The feed of claim 1 said body being storable for a period of at least about six months.

7. The feed of claim 1, said body being self-sustaining in sea water for at least about four days.

8. The feed of claim 1 said body including from about 3–20% by weight humectant.

9. The feed of claim 1, said body including from about 5–12% by weight humectant.

10. The feed of claim 8, said humectant being a polyhydroxy compound.

11. The feed of claim 10, said humectant being glycerin.

12. The feed of claim 1, said total crude protein being derived from protein sources selected from the group consisting of marine meal, marine oil, soy, wheat, oats, barley, corn and mixtures thereof.

13. The feed of claim 1, said carbohydrate source being selected from the group consisting of soy, wheat, oats, barley, corn and mixtures thereof.

14. The feed of claim 1, said body including from about 1–65% by weight of kelp.

15. The feed of claim 14, including from about 5–35% by weight of kelp.

16. The feed of claim 1, said body having a specific gravity in sea water of greater than about 1.0.

17. The feed of claim 16, said specific gravity being greater than about 1.1.

18. The feed of claim 1, said body having a protein dispersibility index of less than about 30%.

19. The feed of claim 18, said protein dispersibility being from about 15–25%.

20. The feed of claim 1, said body having a bulk density from about 35–50 lbs/ft$^3$.

21. The feed of claim 20, said bulk density being from about 40–45 lb/ft$^3$.

22. The feed of claim 1, said body having a maximum diameter of from about 0.5–1.5 cm.

23. The feed of claim 22, said maximum diameter being from about 0.75–1.0 cm.

24. The feed of claim 1, said body having a length of from about 1–2.5 cm.

25. The feed of claim 24, said length being from about 1.5–2 cm.

26. The feed of claim 1, said body including from about 0.1–8% by weight fish oil.

27. The feed of claim 26, said body including from about 0.2–4% by weight fish oil.

28. The feed of claim 1, said body including from about 0.1–3% by weight phosphoric acid.

29. The feed of claim 28, said body including from about 0.5–2% by weight phosphoric acid.

30. The feed of claim 1, said body having a maximum expansion of up to about 20%.

31. The feed of claim 30, said maximum expansion being up to about 10%.

* * * * *